United States Patent Office 3,440,093
Patented Apr. 22, 1969

3,440,093
PROCESS FOR CRYSTALLIZING DEXTROSE
Leo R. Idaszak, Oak Lawn, Ill., assignor to Corn Products Company, New York, N.Y., a corporation of Delaware
No Drawing. Filed Nov. 14, 1966, Ser. No. 593,748
Int. Cl. C13k 1/10
U.S. Cl. 127—58   6 Claims

ABSTRACT OF THE DISCLOSURE

Broadly speaking, the instant invention is concerned with an improved method of crystallizing dextrose. More specifically, the present invention relates to a method of preparing dextrose crystals, relatively coarse in nature via an efficient productive technique. Conventionally, crystalline dextrose is prepared by crystallizing a feed liquor to yield a massecuite and separating out dextrose crystals from the massecuite by removal of mother liquor. The gist of the present invention lies in preparing under certain specified conditions dextrose crystals relatively coarse in character. As an initial step, crystallization should take place under conditions whereby the dextrose crystals during the entire first step of crystallization are substantially completely surrounded by the mother liquor phase. The massecuite is then removed to a separate zone and concentrated to a crystal phase concentration in excess of 50%. Crystalline dextrose is then separated from the massecuite concentration by routine procedures.

---

Dextrose crystals either of the hydrate or anhydrous form may be produced by batch or continuous crystallization of the cooling or evaporative type. The bulk of anhydrous dextrose is primarily produced in evaporative type crystallizers, while most of the hydrate dextrose is produced in batch cooling type crystallizers. The evaporative technique of crystallization is suitably adapted to processing anhydrous dextrose batchwise or continuous.

There is a definite need in the industry to produce dextrose of a relatively coarse nature in an economic and efficient manner. Many ultimate users require a coarse dextrose and such materials usually bring a higher profit margin. Improving the overall crystallization operation to produce increased yields of coarse dextrose would be therefore of substantial economic benefit. For example, the coarse fractions are usually obtained by screening operations and there would be substantially less fine crystals to dispose of or reprocess after screening. Again, coarse sized dextrose crystals generally recovered in perforated screen centrifuges, tend to purge mother liquor in a cleaner and more efficient manner than do the finer particle sizes contained in massecuites. This leads to a higher purity sugar. In addition, washing operations are usually necessary to remove final traces of mother liquor, which step tends to dissolve some of the crystalline sugar. A coarse crystal size massecuite needs less wash water to remove final impurities or traces of mother liquor. Reduction of wash water utilized, which in turn reduces amount of dextrose dissolved, materially decreases loss of dextrose. Thus, final yields of crystalline dextrose in the more coarse form are substantially increased.

Turning specifically to the batch method of preparing dextrose, it has been noted that the rate of crystallization materially decreases as the cycle progresses. Operating at longer cycles decreases rate of productivity in terms of capacity of each crystallizer per unit time. As the crystal phase percent total yield increases over a span of time, actual rate of crystallization decreases. Put in another light, if a batch process could somehow be operated on a shorter cycle, an increased amount of dextrose would be produced per unit time, employing a decreased amount of equipment available. This would lead to substantial reduction in labor, maintenance expense, and in-process inventory of material. Conversely, if improved total output were desired, existing crystallizers could be made to produce substantially greater quantities of dextrose, though operating with the same physical facilities.

In addition, my investigations have also revealed that as crystallization continues over a considerable length of time, an ever increasing amount of fines are formed. This, of course, would substantially reduce total yield of the desirable more coarse fractions formed in greater relative quantities in the initial part of the crystallization.

By way of summation then, if an overall method of making crystalline dextrose could include the concept of effecting the actual crystallization step during a short period of time and at a relatively dilute final massecuite concentration, increased yields per unit time would result. Moreover, these yields would include higher fractions of wanted coarse material. More specific evidence in support of this conclusion will be presented hereinafter.

Again with respect to a continuous type of crystallization, I have noted that superior results are obtained, in terms of both increased productive rate and augmented production of more coarse dextrose crystals, if the crystallization operation is carried out only up to a limited crystal phase concentration.

However, it was further discovered that attempts to isolate the dextrose crystals, utilizing the just discussed short cycle time, and particularly by employment of perforated screen centrifuges, led to an unexpected exceptionally high total crystal loss. In both situations of use of a continuous perforated screen centrifuge and batch perforated screen centrifuge, losses in processing about a 30% concentrated crystal phase massecuite ranged from about 40% to as high as 70% of total crystals available. More specific discussion of this will also appear later in the body of the specification.

In view of the above discussed desiderata, it would therefore be of extreme benefit to the art if an improved method of crystallizing dextrose were known, which dextrose crystals were relatively coarse in makeup as a number average. Particularly, if such a procedure could be devised whereby minimal crystal loss occurred during isolation by techniques such as screen centrifugation, such process would find ready acceptance in the art. If advantages of increased fraction of coarse dextrose and overall process rate increase could be realized in a single method, such technique would be an important advance with respect to the aims of the detxrose processing industry.

It, therefore, becomes an object of the invention to provide an improved method of crystallizing dextrose.

A more specific object of the invention is to provide a method of crystallizing relatively coarse dextrose crystals in high yields which process may be adaptable to either continuous or bath techniques of the cooling or evaporative type.

Yet another object of the invention is to provide a method of crystallizing dextrose by any of the just discussed techniques to produce a final massecuite which can be ultimately processed by means of screen centrifugation without any substantial loss of total crystal weight.

Other objects will appear hereinafter.

In accordance with the invention, I have discovered a substantial improvement in the method of preparing crystalline dextrose. Conventional steps include crystallizing a starch hydrolysate feed liquor to yield a massecuite and separating out dextrose crystals from said massecuite by removal of mother liquor. In a broad sense the improvement forming the gist of the invention comprises effecting said crystallization in a first zone under conditions whereby said dextrose crystals during the whole of said crystallization are substantially completely surrounded by mother liquor. Generally, it has been observed that the crystallization should be effected up to a crystal phase concentration of less than 50% in order to achieve the just mentioned result. In a greatly preferred embodiment, the crystallization is carried out up to a crystal phase concentration ranging from about 20% to about 45% and most preferable at 20%–40%. In some instances, however, depending upon the particular operation and facilities employed, the final crystal phase concentration during crystallization may be even lower than the 20% figure. Crystallization is considered complete after the first step of the invention. As a second phase in the operation, the just described massecuite is removed to a second separate zone, i.e. a different vessel and concentrated to a crystal phase concentration in excess of 50%. During this step the mother liquor supplied to the crystal phase concentrator does not change in concentration or character throughout the entire phase of the concentration operation.

By the term "starch hydrolyzate" is meant the product derived from the enzymatic or acidic hydrolysis of starch, said hydrolysis being effected on gelatinized starch, and as well includes remelted crude and pure dextrose and combinations of any of the above. Crystalline dextrose is then recovered from the massecuite concentrate by conventional means.

The above percentage figures are expressed as weight percent and are based on total dry substance weight. Also, crystal phase yield is calculated by multiplying the weight of the dextrose crystals (anhydrous basis) by 100 and dividing this figure by total D.S.

As briefly alluded to above, the invention is applicable to the manufacture of hydrate or anhydrous dextrose, either by cooling or evaporative type crystallization, and as equally well batch or continuous operations fall within the ambit of the invention. Preferred operations utilizing just described concepts include the batch cooling crystallization of hydrate dextrose and continuous crystallization of anhydrous dextrose. In still another preferred embodiment, the concentrated massecuite having a crystal phase concentration in excess of 50% is processed to recover crystalline dextrose by subjecting the concentrated massecuite to perforate screen centrifugation.

Briefly set out above, in a typical commercial run of a batch cooling crystallization of hydrate dextrose from a starch hydrolyzate, there is a continued decrease in rate of crystallization per unit time. The reader's attention is drawn to Table I, outlining results of a batch crystallization in a commercial plant. By way of example, approximately 52.10% of the total dextrose formed during the cycle is produced during the first 30% of that cycle. On the other hand, approximately 86.13% of total dextrose produced is produced during 60% of the total cycle. As is apparent, operation at shorter cycles would increase productivity. Table II more graphically illustrates this fact.

TABLE I.—BATCH (COOLING TYPE) HYDRATE DEXTROSE CRYSTALLIZATION

[90.7 D.E. massecuite; 76.2% dry substance (d.s.); 8.731 pounds dry substance (d.s.) per gallon]

| Time, hr. | Temp., °F. | Supersaturation, percent | Crystal[1] phase, percent | Diff., percent | Crystals,[2] lb. d.s. | Crystal formed, percent |
| --- | --- | --- | --- | --- | --- | --- |
| 0 | | | 6.0 | | 5,239 | 9.68 |
| 10 | 115 | 22 | 15.2 | 9.2 | 13,271 | 24.52 |
| 20 | 110 | 20 | 24.0 | 8.8 | 20,954 | 38.71 |
| 30 | 105 | 16 | 32.3 | 8.3 | 28,201 | 52.10 |
| 40 | 100 | 11 | 40.0 | 7.7 | 34,924 | 64.52 |
| 50 | 95 | 4 | 47.4 | 7.4 | 41,385 | 76.45 |
| 60 | 90 | ≈0 | 53.4 | 6.0 | 46,624 | 86.13 |
| 70 | 85 | ≈0 | 57.2 | 3.8 | 49,941 | 92.26 |
| 80 | 80 | ≈0 | 59.9 | 2.7 | 52,299 | 96.61 |
| 90 | 75 | ≈0 | 61.7 | 1.8 | 53,870 | 99.52 |
| 100 | 70 | ≈0 | 62.0 | 0.3 | 54,132 | 100.00 |

[1] Percentage of dry substance in crystallizer present as crystals.
[2] Size of commercial crystallizers from which data were obtained were approximately 10,000 gallons. Pounds crystal dry substance were calculated from crystallizer volume, massecuite dry substance concentration and crystal phase measurements.

TABLE II.—CYCLE TIME VERSUS CRYSTALLIZER PRODUCTION CAPACITY

| Cycle, hr. | Pound crystals per hour | Ratio | 1/ratio |
| --- | --- | --- | --- |
| 30 | 940 | 1.74 | 0.576 |
| 60 | 777 | 1.44 | 0.696 |
| 100 | 541 | 1.00 | 1.000 |

By way of specific reference to Table II, operating the crystallizers on a 30-hour cycle would increase crystallizer capacity by 74% relative to a 100-hour cycle. Expressed in another light, any given amount of dextrose could be produced in only 57.6% of the crystallizers in operation. The economic advantages of practicing the first step of my invention within the scope specified are apparent.

Investigations also revealed that crystal population decreased in size as crystallization proceeded and crystal phase increased particularly above about 50% concentration. Table III illustrates this conclusion.

TABLE III.—CRYSTAL SIZE VERSUS CRYSTAL PHASE

| Crystal phase, percent | Weight percent retained, U.S. sieve No. | | | Specific surface area, sq. ft./lb. |
| --- | --- | --- | --- | --- |
| | 20 | 80 | 200 | |
| 27.5 | 2.9 | 79 | 99 | 104.5 |
| 46.0 | 1.2 | 69 | 98 | 124.7 |
| 58.0 | 2.5 | 59 | 93 | 141.4 |
| 61.5 | 2.5 | 57 | 92 | 160.1 |

As is apparent to the reader, the percent of more coarse crystals decreased with increasing crystal phase yield. The data is particularly meaningful with respect to screening through an 80-mesh screen. The actual number of fine crystals formed in the later stages of the crystallization was much greater than that indicated by weight percent, since it may be roughly stated that the ratio of number of crystals to weight of crystals varies as the cube of the characteristic dimension of the crystals.

The average size of the crystal population may also be expressed in terms of specific surface area of samples taken after various lapsed amounts of time during crystallization. The method for calculating specific surface in this investigation was based on the article: "Methods of Representing Distribution of Particle Size" by J. B. Austin; Ind. & Eng. Chem. (Analytical Edition); vol. 11; No. 6; June 1939. An inspection of Table IV below indicates material increase in specific surface area and corresponding proportional increase in fineness of the crystal population as process time elapsed. For example, in some measurements at crystal phase yields above 60%, specific surface areas read as high as 200 square feet per pound of crystals for massecuite obtained after the 100-hour cycle.

TABLE IV.—SIZE OF CRYSTAL POPULATION EXPRESSED AS SPECIFIC SURFACE AREA FOR CRYSTALLIZATION TESTS OF TABLE I

| Time, hr. | Crystal phase, percent | Specific surface area, sq. ft./lb. |
| --- | --- | --- |
| 0 | 6.0 | |
| 10 | 15.2 | |
| 20 | 24.0 | |
| 30 | 32.3 | 99.5 |
| 40 | 40.0 | 109.5 |
| 50 | 47.4 | 118.8 |
| 60 | 53.4 | 127.6 |
| 70 | 57.2 | 135.0 |
| 80 | 59.9 | 139.5 |
| 90 | 61.7 | 143.0 |
| 100 | 62.0 | 159.0 |
| | | 160.0 |

The same phenomenon of realization of coarse crystals is achieved on a continuous scale if crystallization is effected at all times below about a 50% crystal phase. In one test a continuous vacuum evaporative crystallizer operated for production of anhydrous dextrose was run at an average crystal phase of about 30%. This crystal phase concentration insured the condition that each individual crystal was at all times surrounded by mother liquor without touching other crystals. In other words, the volume occupied by the crystals was less than the total volume of the massecuite. The resultant crystals were quite coarse and approximately 33% by weight were retained on a 20-mesh screen U.S. Sieve No. Approximately 97% were retained on an 80-mesh screen.

As shown above, it is of critical necessity that during the entire step of crystallization the dextrose crystals be substantially completely surrounded by mother liquor. By way of explanation of this phenomena, though not to be construed as limitative, it has been shown that at some point in the crystallization step, the crystals usually fill all the volume in the crystallizers. The mother liquor occupies at this time only the void space. Generally this occurs in the range of about 45% to 50% crystal phase. Above this phase, two phenomena occur. In one instance, there is breakage of a portion of the large crystals into smaller particles so as to allow them to fit in the void spaces between the remaining large crystals. The other occurrence is further crystallization of only small crystals within the remaining void space. This theory has been further borne out by data showing linear viscosity buildup of dextrose massecuites until about 45% crystal phase. Above about 45%–50% crystal phase massecuite viscosity increased at about a four times greater degree than below this range. This indicates a definite change in the nature of the massecuite at about a 45%–50% crystal phase.

As generally discussed above, while dextrose crystals of an acceptable coarse character can be realized by maintaining production of the crystals by surrounding with mother liquor, subsequent isolation of the relatively dilute massecuite led to substantial problems. Without a further processing step, exceptionally high crystal loss at the point of centrifugation was noted. To demonstrate this tests were made employing about a 30% crystal phase massecuite fed to conventional batch and continuous perforated screen centrifuges. In one series of runs, a continuous centrifuge was employed which was equipped with a conical screen having openings of 0.0065 inch. The screen had an open area of 3.5% and the continuous centrifuge utilized an average centrifugal force of 1300× gravity. Approximately 40%–50% of the total crystals in the massecuite were lost through the screen, even though only 2.5% of the crystals in the supply were smaller than the 0.0065 inch opening of the screen. Different screens and centrifuge conditions failed to reduce the losses. Exact reasons for crystal breakage in the centrifuge could not be put forth, and the phenomenon was completely unexpected.

Like tests were made with a perforate screen batch centrifuge. This screen centrifuge had 0.0020-inch openings and contained 625 holes per square inch. At 30% crystals phase, losses as high as 72% of total crystals supplied were experienced. Losses could be reduced by continuing crystallization until a crystal phase of above 50% was reached, and then isolating the crystals. However, as ably shown above this advantage was offset by loss of productive rate at the terminal portion of the cycle, and particularly by substantial decrease in yields of coarse dextrose crystals.

At this point it appeared that the improved results realized through shorter cycles in a batch process or through a continuous operation at reduced crystal phase would be negated by the resulting high crystal loss at the centrifuge operation. However, it was then realized for some yet undetermined reason that very minimal crystal loss would occur if the dilute crystal phase massecuite was first transported to a separate vessel and only then concentrated. The massecuite should be concentrated after transfer to a separate zone to a point above 50% crystal phase or greater to realize this benefit. Excellent results are achieved when the massecuite is concentrated up to 50%–65% or greater.

The concentration step itself should be run under conditions such that the mother liquor does not change in character or concentration during the entire operation. By this is meant that chemical analysis of the mother liquor remains constant as does mother liquor solids content at any time during this phase of the process.

Thus, it was found that a concentration step effected in a vessel separate from the crystallization unit in some manner both greatly diminished subsequent crystal loss, and markedly increased yield of coarse crystals. The advantage of increased production rate via working the overall process was an added benefit.

The following example illustrates a typical practice of the invention.

EXAMPLE I

A massecuite operated to achieve hydrate dextrose was prepared according to the batch cooling technique generally outlined in Table I, with the exception that crystallization was terminated after about 41 hours at a crystal phase of 41.6%. Likewise a second massecuite was made from a continuous vacuum evaporative crystallizer operated for production of anhydrous dextrose. The crystallizer held 12,700 gallons of massecuite of 95.4 D.E. purity and was operated at an average crystal phase of approximately 31%. The average crystallization rate was 4,250 pounds crystal per hour.

The concentrator in this run was an imperforate solid bowl scroll discharge centrifuge with a 6-inch diameter and having a centrifugal force 3100× gravity. Both the anhydrous and hydrate relatively dilute massecuites from crystallization runs described above were concentrated by this apparatus and then crystals isolated on a screen centrifuge. In each case mother liquor character and concentration remained constant throughout the entire concentration step. This data is summarized below as Table V.

As is readily ascertainable, the dextrose crystal product was extremely high in coarse fractions, compared to products derived from commercial runs as earlier presented. Again, utilizing the entire process including concentration step resulted in increased production rates in the neighborhood of 40%–60%. Also, little if any crystal loss occurred. This should be compared to isolation of crystals of more dilute crystal phase as shown above. Such advantages are a distinct advance in the state of the art.

TABLE V.—CRYSTAL PHASE CONCENTRATION RESULTS
[Imperforate solid bowl scroll discharge type centrifuge (6-inch diameter, 6,000 r.p.m.)]

|  | Anhydrous dextrose test results | Hydrate dextrose test results |
| --- | --- | --- |
| Supply: |  |  |
| Rate (pounds/minute) | 41.0 | 27.2 |
| Crystal phase (percent) | 29.2 | 41.6 |
| Crystal size (weight percent retained): |  |  |
| 20 mesh | 24.0 | 0.7 |
| 80 mesh | 94.7 | 70.0 |
| 200 mesh | 99.8 | 98.6 |
| Concentrated massecuite: |  |  |
| Rate (pounds/minute) | 19.4 | 12.8 |
| Crystal phase (percent) | 57.0 | 74.1 |
| Crystal size (weight percent retained), U.S. sieve No.: |  |  |
| 20 mesh | 19.5 | 1.4 |
| 80 mesh | 83.5 | 48.0 |
| 200 mesh | 98.0 | 88.0 |
| Mother liquor removed: |  |  |
| Rate (pounds/minute) | 21.6 | 14.4 |
| Crystal phase (percent) | 2.0 | 0 |
| Crystal loss (percent)[1] | 3.3 | 0 |

[1] Analyzed by Baumé measurement of mother liquor and analysis for dry substance.

It should be understood that while the instant invention, and particularly the concentration step was illustrated by reference to a centrifuge operation, the concentration step may be satisfied by a number of conventional units.

For example, pressure or vacuum filters, gravity-type settlers, etc. may be also employed without departing from the scope of the invention. Due to economic and operational advantages, use of a centrifugal concentrator is greatly preferred.

The concentration step and crystal isolation step may be effected simultaneously in a single unit. For example, the above described runs involving bowl discharge centrifuge may be continued above 50% and terminated at any stage up to about a 90% crystal phase and the dewatered product used as such, for example, as a source of slab sugar. Thus, by the term "crystalline dextrose" is meant a solid dextrose product though one of varying degrees of purity and bound water, and includes both anhydrous and hydrate dextrose crystals and cast, or "slab" forms of dextrose or dextrose in graular or pellet form. It is preferred, however, that the dextrose crystals be isolated in a zone separate to the concentrator equipment since coarse crystals of greater purity are realized, which product is much in demand in commerce.

The process is further ameliorated in still another embodiment by routine effluent mother liquor from the crystal phase concentrator to subsequent crystallization cuts without additional evaporation or refining. Operating subsequent cuts at dilute crystal phase concentrations would yield the same relative high crystallization rates indicated for the first or earlier cuts. Thus, excellent dextrose final products of desired coarse nature can be achieved without suffering any loss of total yield compared to current crystallization operations.

In some instances, following the just outlined steps leads to even higher yields. By way of illustration, when a crystal phase concentration is continued to 60% or higher, a physical limit for the crystallizers used is reached. The mother liquor from the crystals of 60% crystal phase concentration contains more than 50% dextrose on a dry substance base. Thus, additional dextrose in the mother liquor is available for recovery. In the conventional operation wherein the crystal phase is continued to a high concentration, recovery of this additional dextrose was not possible. Crystallization completed to dilute crystal phase concentration of this low dextrose mother liquor was not economical because of the high crystal losses in the perforate screen centrifugal recovery operations. However, with this invention the dilute crystal phase massecuite can be concentrated so as to obtain high recovery of the dextrose from subsequent operations.

While certain representative embodiments and details have been shown for the purpose of illustrating the invention, it will be apparent to those skilled in the art that various changes and modifications may be made therein without departing from the spirit or scope of the invention.

The invention is hereby claimed as follows:

1. In a process of making crystalline dextrose which comprises the steps of crystallizing a feed liquor to yield a massecuite and separating out dextrose crystals from said massecuite by removal of mother liquor; the improvement which comprises effecting said crystallization in a first zone under conditions whereby said dextrose crystals during the whole of said crystallization are substantially completely surrounded by mother liquor, removing the resulting massecuite to a second separate zone, concentrating said massecuite in said second zone to a crystal phase concentration in excess of 50% by weight of resulting concentrated massecuite while maintaining constant the character and concentration of mother liquor, and recovering crystalline dextrose from said resulting massecuite concentrate.

2. The process of claim 1 wherein said crystallization is effected up to a crystal phase concentration of less than 50%.

3. The process of claim 2 wherein said crystalization is effected up to a crystal phase concentration ranging from about 20% to about 40%.

4. The process of claim 1 wherein said crystallization is carried out in a crystallizer selected from the group consisting of a batch cooling type crystallizer, a continuous cooling type crystallizer, a continuous evaporative type crystallizer and a batch evaporative type crystallizer.

5. The process of claim 4 wherein said crystalline dextrose is selected from the group consisting of anhydrous and hydrate dextrose.

6. The process of claim 1 wherein said crystalline dextrose is recovered by subjecting said concentrated massecuite to perforate screen centrifugation.

References Cited

UNITED STATES PATENTS

| | | | |
|---|---|---|---|
| 1,693,118 | 11/1928 | Newkirk | 127—30 |
| 1,708,940 | 4/1929 | Daly | 127—58 |
| 1,783,626 | 12/1930 | Newkirk | 127—30 |
| 1,976,361 | 10/1934 | Newkirk | 127—30 X |
| 3,257,665 | 6/1966 | Idazak | 127—58 |

OTHER REFERENCES

Newkirk: "Development and Production of Anhydrous Dextrose," Industrial and Engineering Chemistry, vol. 28, No. 7, pp. 760–766 (1936).

MORRIS O. WOLK, *Primary Examiner.*

D. G. CONLIN, *Assistant Examiner.*

U.S. Cl. X.R.

127—61, 62